Oct. 27, 1925.
H. A. BERKMAN
1,559,306
ACTUATING HANDLE FOR A RECIPROCATING MEMBER
Filed June 10, 1925
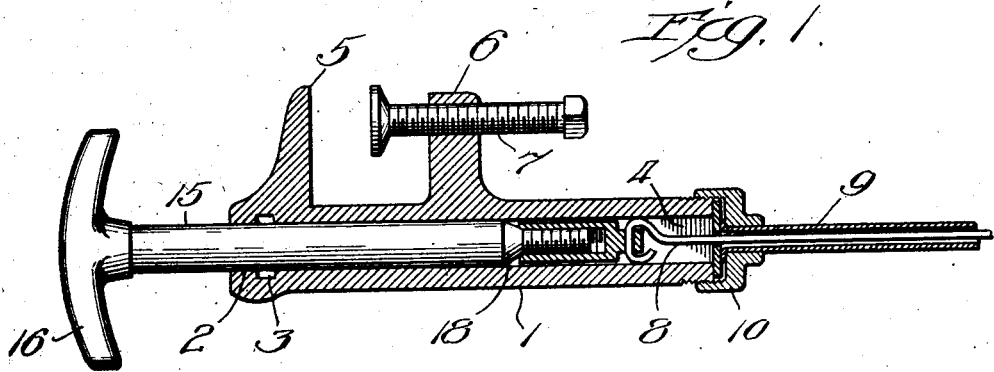
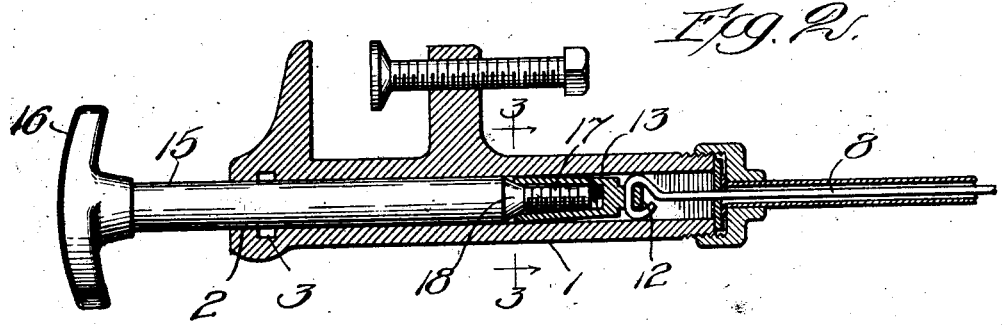
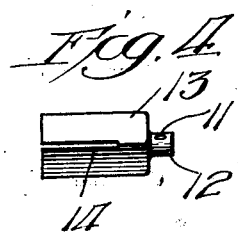
Inventor:
Herbert A. Berkman
By Wm. F. Freudenreich,
Atty Patented Oct. 27, 1925.

1,559,306

UNITED STATES PATENT OFFICE.

HERBERT A. BERKMAN, OF CHICAGO, ILLINOIS, ASSIGNOR TO ZIM MANUFACTURING COMPANY, A CORPORATION OF ILLINOIS.

ACTUATING HANDLE FOR A RECIPROCATING MEMBER.

Application filed June 10, 1925. Serial No. 36,213.

*To all whom it may concern:*

Be it known that I, HERBERT A. BERKMAN, a citizen of the United States, residing in Chicago, county of Cook, State of Illinois, have invented a certain new and useful Improvement in Actuating Handles for a Reciprocating Member, and declare the following to be a full, clear, and exact description of the same, such as will enable others skilled in the art to which it pertains to make and use the same, reference being had to the accompanying drawing, which forms a part of this specification.

There are various devices on automobiles and elsewhere that are actuated by a pull handle connected to a wire. The object of the present invention is to produce a simple and novel construction and arrangement for attaching such a handle to a wire and permitting the handle to be readily locked in any desired position, by a turning movement, without twisting the wire.

A further object of the present invention is to produce a simple and novel mounting on the dash of an automobile for a pull handle device.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a central vertical longitudinal section through one of my improved devices adapted to be mounted on an automobile dash, the parts being shown in an unlocked condition; Fig. 2 is a view similar to Fig. 1, showing the parts in a locked condition; Fig. 3 is a section taken on line 3—3 of Fig. 2 and Fig. 4 is an elevation of the expanding nut looking at one of the corners of the latter.

Referring to the drawing, 1 represents a sleeve-like part the opening in which is round at one end, as indicated at 2, between an annular enlargement or groove 3 and said end, while the remainder of the bore is non-circular, preferably square as indicated at 4. Adjacent to the end having the round bore portion are two upwardly projecting lugs 5 and 6 spaced apart from each other. Through one of the lugs extends a set screw 7 that is adapted to cooperate with the other lug to form an adjustable clamping jaw whereby the device may be fastened to the dash of an automobile.

Into the square end of the bore in the member 1 extends a wire 8; this wire being housed, in a usual or suitable way in, a tube 9 that is attached to the end of the member 1 by a screw cap 10 or the like. The inner end of the wire is passed through an opening 11 in a projection 12 on one end of a cup-shaped nut 13 having a cross section corresponding to that of the non-circular portion of the bore, and slightly smaller than the latter so that the nut may be moved along the bore. The nut is split, conveniently at the corners from the open end toward the base, as indicated at 14, and it is made of a more or less resilient material which permits it to expand and then to resume its normal shape when the expanding pressure is removed. Extending into the opposite end of the member 1 from that through which the wire enters is a stem 15, preferably circular in cross section, having at its outer end a handle 16. The inner end of the stem is reduced in diameter and is screw-threaded, as indicated at 17, to fit the nut. At the base of the screw-threaded portion of the stem is a frusto-conical section 18 that joins the screw-threaded section to the body of the stem; this frusto-conical part constituting a wedge adapted to enter the mouth of the cup-shaped nut and expand the sides of the nut laterally.

As long as no portion of the wedge enters the nut, the latter remains smaller in cross sectional area at all points than the interior of the square bore, so that the stem may be reciprocated to move the wire lengthwise. When it is desired to lock the wire in any position to which it has been brought, the handle is simply turned in a direction to screw it further into the nut; thus forcing the wedge into the mouth of the nut and spreading the walls of the latter until they engage with the surrounding wall of the supporting sleeve.

It will be seen that the pressure on the walls of the nut may be regulated so as tightly to lock the nut in place or else cause it to be held with any desired degree of friction. In other words, the nut need not be locked so tightly as to necessitate the turning of the handle before the nut can be moved, but the nut may be held against the surrounding walls with any desired degree of pressure, so that the handle may be moved back and forth but will be frictionally held against accidental displacement.

By making the major portion of the bore in the supporting tube non-circular in cross section, the screwing and unscrewing of the stem cannot cause any turning movement of the nut and, therefore, cannot produce any twist in the wire.

It will thus be seen that I have produced a simple and novel construction which permits an operating handle to be readily attached to the lower edge of a dash, permits a wire and the actuating member therefor to be readily connected to and disconnected from each other; insures that the wire will not be twisted in use or during the process of fastening it to or unfastening it from the handle; and enables the user firmly to lock the handle and its connected wire in any position of adjustment or else to hold it frictionally with any desired degree of pressure in any such position.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, a support having a passage therethrough, a handle having a stem extending slidably into said passage from one end of the latter; a member to be reciprocated extending into said opening from the other end, an expansible nut on said member, a screw-threaded part on said stem adapted to enter said nut, and a wedge member on said stem adapted to enter the nut and expand it.

2. In combination, a support having a passage therethrough, one end of the passage being non-circular, a nut slidable in said non-circular portion of the passage and held against rotation thereby, said nut being cup-shaped and having its sides slit longitudinally, a member to be actuated attached to the base of the nut, an actuating stem extending into said passage and screwed into said nut, said stem having thereon a wedge member adapted to enter the mouth of the nut and expand the sides of the latter laterally into frictional engagement with the surrounding wall.

3. In combination, a tubular support having a non-circular bore; a nut slidable within and held against rotation relatively to said bore, said nut being cup-shaped and having its sides slitted from the mouth toward the base, a wire to be reciprocated attached to the base of the nut, and an actuating stem screwed into the mouth of the nut, said actuating stem having a frusto-conical part adapted to enter the mouth of the nut and expand the nut into frictional engagement with the surrounding walls.

4. A device of the character described, comprising an elongated sleeve, lugs projecting upwardly laterally from one end of the sleeve, a set screw extending through one of the lugs and lying parallel to said sleeve, a reciprocating member extending through said sleeve, and a handle on said member beyond the end at which said lugs are located.

In testimony whereof, I sign this specification.

HERBERT A. BERKMAN.